United States Patent [19]

Kawada et al.

[11] 4,314,191
[45] Feb. 2, 1982

[54] PROTECTIVE SYSTEM FOR INVERTER CIRCUIT USED IN DRIVING AC MOTORS

[76] Inventors: Shigeki Kawada, 346-15, Oaza-Shimoda, Hino-shi, Tokyo 191; Hiroshi Ishida, 2-73, Matsubara-cho, 2-chome, Hamura-machi, Nishitama-gun, Tokyo 190-11, both of Japan

[21] Appl. No.: 89,741

[22] Filed: Oct. 31, 1979

[51] Int. Cl.³ .............................................. H02P 5/28
[52] U.S. Cl. ................................... 318/802; 318/807; 318/808
[58] Field of Search ............................... 318/798–803, 318/805, 807–812; 363/56

[56] References Cited

U.S. PATENT DOCUMENTS 3,577,052  5/1971  Bauer ............................... 318/798
3,603,856  9/1971  Zalar et al. ....................... 318/798
3,719,873  3/1973  Graf ................................. 318/798

Primary Examiner—David Smith, Jr.
Assistant Examiner—G. Z. Rubinson

[57] ABSTRACT

The invention relates to a speed control system which includes an inverter circuit for converting a direct current into a polyphase alternating current in the form of a rectangular wave by the switching action of transistors, and an inverter drive circuit adapted to apply control signals to the inverter circuit to bring its output frequency to a desired value, an induction motor being rotated by the alternating current supplied by the inverter circuit. The system features current detection means for detecting current that flows through the output side of the inverter circuit, and decision means for examining the output of the current detection means for a fixed period at a frequency higher than that at which the induction motor is driven. The decision means interrupts the operation of the inverter circuit when it has been judged that the current flowing through the outside thereof is greater than a prescribed value, and actuates the inverter circuit when the current flowing through the output side thereof is less than the prescribed value. The result is that the inverter circuit is allowed to operate intermittently at a current which does not exceed a prescribed value, whereby the induction motor runs continuously without any observable halt in operation.

5 Claims, 3 Drawing Figures

PROTECTIVE SYSTEM FOR INVERTER CIRCUIT USED IN DRIVING AC MOTORS

BACKGROUND OF THE INVENTION

This invention relates to a protective system for an inverter circuit employed in driving an AC motor.

DC motors have long been adopted for such uses as spindle motors in machine tool and crane motors, but in recent years this field has seen increasing application of AC motors, particularly of the induction type, owing to the fact that they can now be controlled in speed over a wide range in the same manner as the DC motors which they are gradually replacing.

The known AC motor speed control systems generally include an inverter circuit for converting a direct current into an alternating current, the direct current being supplied by a battery or obtained by rectifying a commercial three-phase AC power source, as well as an inverter drive circuit for varying the frequency of the alternating current delivered by the inverter circuit. This alternating current is then applied to an AC motor which can be rotated at the desired speed by varying the frequency of the alternating current at will.

In the inverter circuit the conversion of direct current to alternating current is accomplished by repeatedly switching thyristors on and off if the inverter circuit is of the thyristor type. However, one disadvantage of the inverter circuit that relies on thyristors is that it must be separately provided with a circuit to turn off the thyristors since the thyristors do not have the ability to perform this function themselves even if they can turn themselves on.

In recent years, high output power transistors capable of controlling motors in the several tens of kilowatt class have been developed, and this has in turn led to the development of AC motor speed control systems which employ inverter circuits composed of such high output power transistors. These inverter circuits are much simpler than those employing the thyristors since each power transistor is controlled merely by the application of a base signal which renders the transistor conductive or non-conductive. However, transistors are weak against over currents so that the inverter circuit must be provided with a protective circuit that protects the transistors from damage by immediately interrupting the direct current supplied to the inverter circuit if an overcurrent flows into its transistors. In consequence, working efficiency is diminished by this arrangement since an AC spindle motor whose speed is controlled by a transistor-type inverter circuit will be shut down every time an overload occurs in the machine tool employing such a system.

SUMMARY OF THE INVENTION

It is an object of the present invention to provide a protective system capable of suppressing an overcurrent in a transistor-type inverter circuit for driving an AC motor even if generation of the overcurrent has already begun.

It is another object of the present invention to provide a protective circuit capable of suppressing an overcurrent in a transistor-type inverter circuit for driving an AC motor while permitting the AC motor to run continuously without being shut down even if generation of the overcurrent has already begun.

It is still another object of the present invention to provide a protective system capable of suppressing an overcurrent in an inverter circuit for driving an AC motor while permitting the AC motor to run continuously without being shut down even if generation of the overcurrent has begun and regardless of its phase.

It is a further object of the present invention to provide a system in which the operating level of a protective circuit can be set at will.

The novel features of the present invention are set forth in the appended claims, while other objects thereof will be apparent from an understanding of the following detailed description of a preferred embodiment. Numerous advantages not touched upon herein will also be readily apparent to those skilled in the art upon practicing the present invention.

DESCRIPTION OF THE PREFERRED EMBODIMENT

Figure 1:
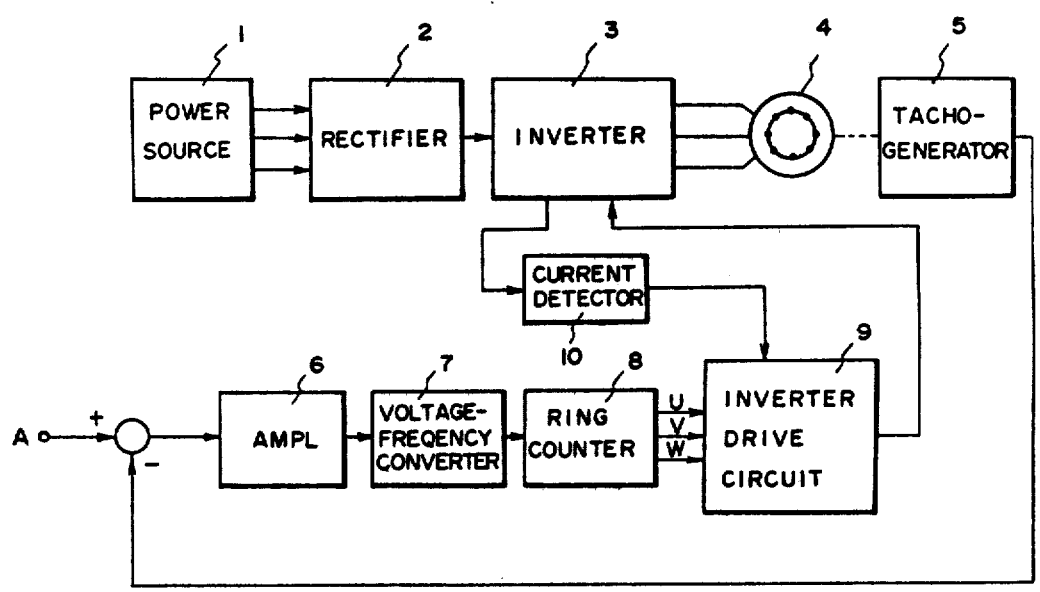
FIG. 1 is a functional block diagram of an embodiment in accordance with the present invention.

The functional block diagram of FIG. 1 illustrative of a control system for driving an induction motor comprises a three-phase commercial power source 1, rectifier circuit 2, an inverter circuit 3 that employs power transistors, an induction motor 4, tachometer generator 5, amplifier 6, voltage-frequency converter (referred to hereinafter as a V-F converter) 7, three-phase ring counter 8, inverter drive circuit 9, and an overcurrent detection circuit 10. A speed instruction signal applied to an input terminal A is fed to the V-F converter 7 after being amplified in amplifier 6, the V-F converter producing a pulse signal output whose frequency is proportional to the voltage which appears on the output side of the amplifier 6. The three-phase ring counter 8 is operable to produce three rectangular voltage waves U, V and W successively displaced in phase by 120 degrees in response to the pulse signal delivered by the V-F comparator 7. The inverter drive circuit 9 is in turn responsive to the three rectangular waves from three-phase ring counter 8 to produce a drive signal for controlling the groups of power transistors constituting the inverter circuit 3. The inverter circuit 3 constitutes a three-phase rectangular wave power source. Specifically, the inverter circuit 3 is controlled by the inverter drive signal to produce three-phase rectangular waves by switching the direct current delivered by the rectifier circuit 2, the three-phase outputs then being supplied to the induction motor 4. This three-phase power source rotates the induction motor whose speed is detected by the tachometer generator 5 adapted to apply feedback representative of motor speed to the input side of the system. Thereafter a closed loop comprising a control system functions to reduce to zero the output at a summing or mixing point, whereby the induction motor 4 is made to rotate at the instructed speed. If an excessive electric current flows into the inverter circuit 3, the overcurrent detection circuit 10 detects this fact and so informs inverter drive circuit 9 which responds to produce a drive signal that limits the flow of current through the inverter circuit 3.

Figure 2:
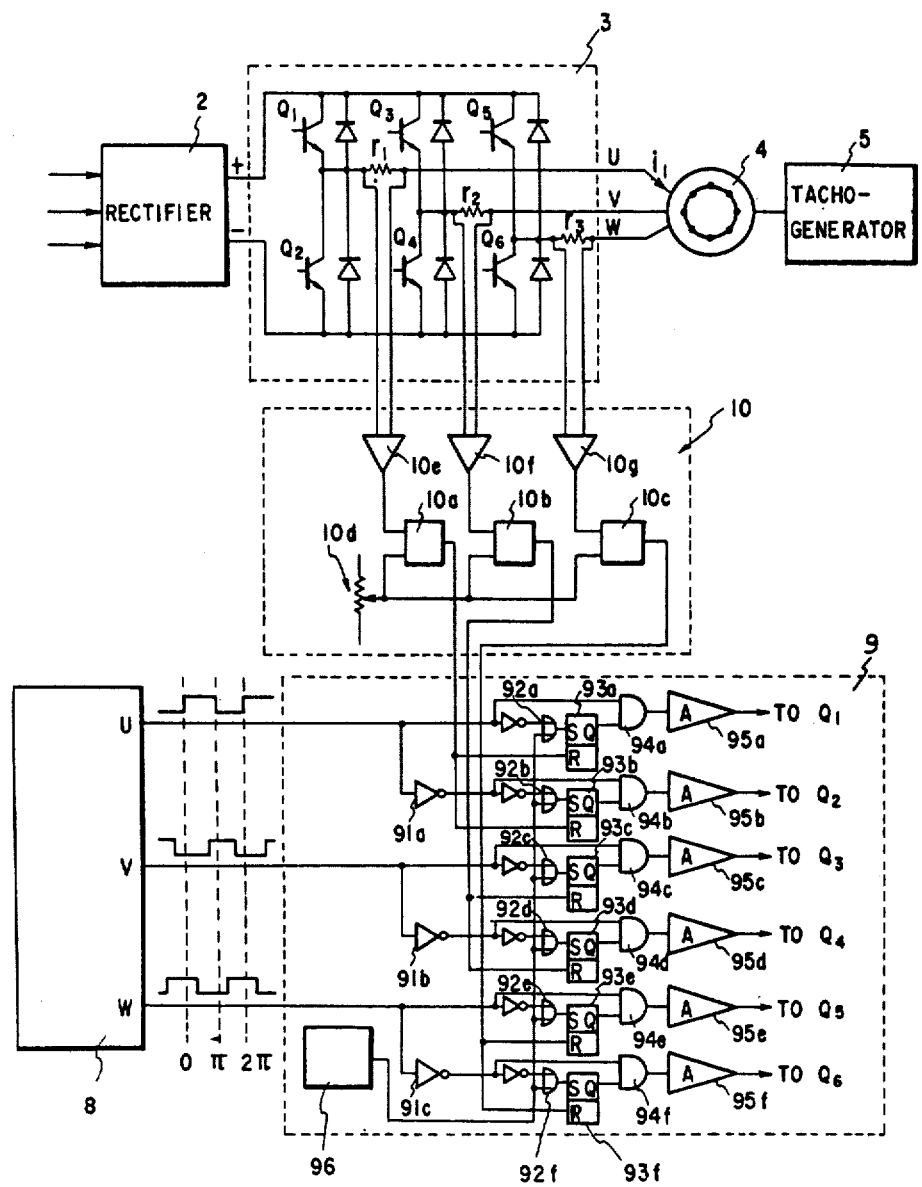
FIG. 2 is a detailed circuit diagram of an overcurrent protection device in accordance with the present invention.

The device for protecting against this overcurrent is shown in FIG. 2 which illustrates the circuit in concrete form. The inverter circuit 3 comprises power transistors $Q_1$ through $Q_6$ and free wheeling diodes $D_1$ through $D_6$, and has current detection resistors $r_1$, $r_2$, $r_3$ inserted between each of the phase outputs and the induction motor 4. The overcurrent detection circuit 10 includes comparators 10a, 10b and 10c having one input terminal connected to an overcurrent value setting device 10d and their other input terminal to both sides of respective resistors $r_1$, $r_2$, $r_3$ through isolation amplifiers 10e, 10f, 10g, respectively. Inverter drive circuit 9 comprises three inverters 91a, 91b, 91c, six OR gates 92a through 92f, six flip-flops (referred to hereinafter as FF) 93a through 93f, six AND gates 94a through 94f, six drivers 95a through 95f, and a pulse generator 96. The oscillation frequency of pulse generator 96 is set to be sufficiently higher than the frequency of the rectangular waves delivered by the three-phase ring counter 8 or, more specifically, several tens of times higher than the maximum frequency of the variable rectangular waves.

The power transistors $Q_1$ through $Q_6$ constituting inverter circuit 3 are protected from overcurrents through the following operation.

Figure 3:
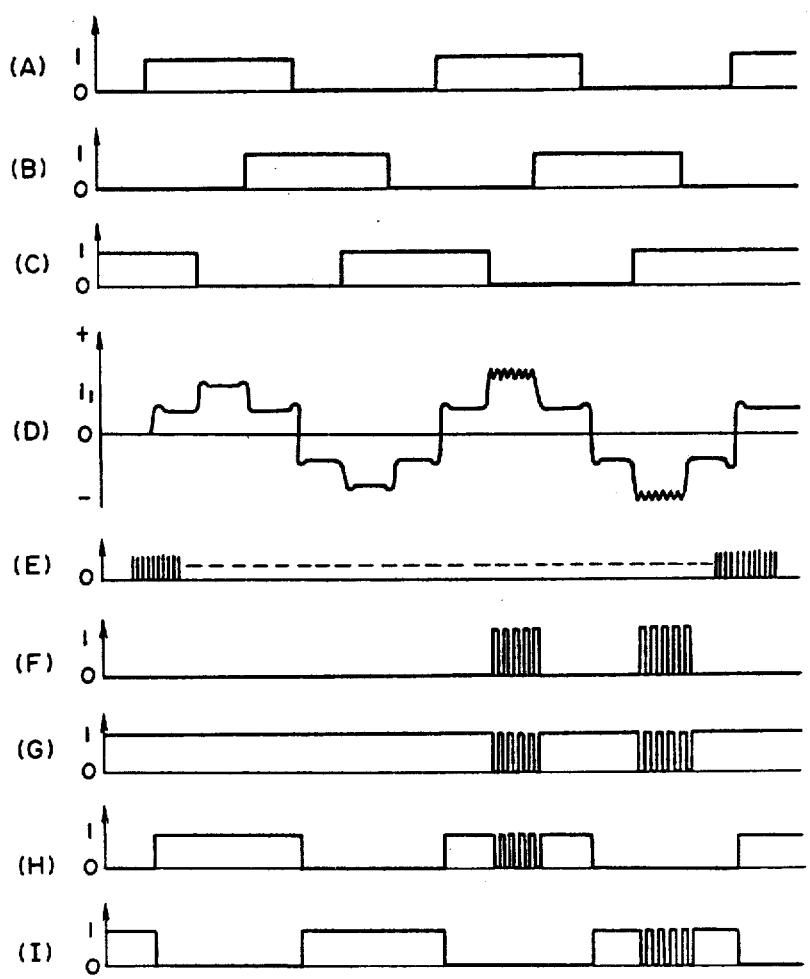
FIG. 3 is a schematic diagram showing waveforms associated with various portions of the overcurrent protection device illustrated in FIG. 2.

The rectangular waves denoted by A, B and C in FIG. 3 are delivered to inverter drive circuit 9 from the respective U, V and W phase outputs of three-phase ring counter 8. Limiting the discussion to the phase U for simplicity, FF 93a is set when the rectangular wave for this phase goes to logic "0" to send a corresponding signal through the OR gate 92a. The output Q of FF 93a therefore goes to logic "1", applying a high level signal to one input terminal of AND gate 94a which is thus opened. When the rectangular wave undergoes a reversal and goes to logic "1", a corresponding "1" signal passes through the open AND gate 94a and is then applied to driver 95a which amplifies the signal and feeds it to power transistor $Q_1$ to turn the transistor on. When the rectangular wave again returns to logic "0", AND gate 94a produces an output at logic "0" which results in the turn-off of power transistor $Q_1$.

The circuitry which includes the driver 95a has the inverter 91 inserted between its input side and the U-phase line and therefore produces an output signal delayed in phase by 180 degrees with respect to the output of driver 95a. Thus, when power transistor $Q_1$ is turned on, power transistor $Q_2$ is turned off. Conversely, when power transistor $Q_1$ is turned off, power transistor $Q_2$ is turned on.

The aforesaid operation also takes place in the case of the V and W phases as well, with power transistors $Q_3$ and $Q_4$ being alternately turned on and off in repetitive fashion, as well as the power transistors $Q_5$ and $Q_6$. Switching these power transistors on and off in combination produces three-phase voltage waves that drive the induction motor 4. When the induction motor is runnig normally, a current $i_1$, illustrated by the first half of the waveform D in FIG. 3, flows through the U-phase line chosen to serve as an example.

If an overcurrent should be generated and begin to flow in the U-phase line of the inverter circuit 3, there will be a large increase in the voltage developed across the resistor $r_1$, and the output of comparator 10a will go to logic "1" if the voltage exceeds a value which has been set by the overcurrent value setting drive 10d. The "1" signal resets FF 93a and FF 93b, with the result that AND gates 94a, 94b are closed and power transistors $Q_1$ and $Q_2$ turned off simultaneously so that the flow of current through these transistors is interrupted. This operation protects the power transistors from the overcurrent and simultaneously returns the output of comparator 10a to logic "0".

On the other hand, pulse generator 96 is constantly supplying the pulses shown in FIG. 3E to the OR gates 92a through 92f. Hence, immediately after FF 93a and FF 93b are reset they receive these pulses through the OR gates 92a and 92b and are instantly set thereby. When this occurs the power transistors $Q_1$ and $Q_2$ are turend on or enabled as described above and hence begin to conduct in order to drive the motor. However, if the current $i_1$ flowing through resistor $r_1$ still attempts to attain an excessive value, the transistor protecting operation described above is restored to once again disable power transistors $Q_1$ and $Q_2$ and hence protect them. The FF's 93a, 93b are reset and then immediately set again by the arrival of the pulses from pulse generator 96. This operation continues until induction motor 4 is no longer being subjected to an overload, the size of the current flowing through resistor $r_1$ thus decreasing to an acceptably small value. If this is the case, power transistors $Q_1$ and $Q_2$ are permitted to continue switching normally to produce the desired rectangular wave.

FIG. 3F illustrates the output waveform from comparator 10a when the comparator functions as described above, FIG. 3G the Q output waveforms from FF 93a and 93b, FIG. 3H the output waveform from AND gate 94a, and FIG. 3I the output waveform from AND gate 94b.

It should be noted that utilizing the comparators in the overcurrent detection circuit 10 allows the overcurrent to be detected regardless of the direction in which current flows through the resistor $r_1$. Moreover, the transistor protecting operation is performed in a similar manner in the drive systems of power transistors $Q_3$, $Q_4$ and $Q_5$, $Q_6$.

The present invention as described herein thus makes use of a gating circuit provided on the input side of an inverter drive circuit, and is arranged such that the gating circuit is closed when an overcurrent has begun to be generated within the inverter circuit, but is immediately opened by a pulse from a pulse generator which supplies such pulses at a frequency higher than that of the input to the inverter drive circuit. Accordingly, even if an overcurrent begins to flow in the inverter circuit, it is possible to suppress the overcurrent, and hence protect the power transistors in the inverter circuit from breakdown that could otherwise be caused by the overcurrent, without terminating the operation of the inverter circuit. Moreover, the fact that the overcurrent protection operation is effected by the gating circuit which is inserted on the input side of the inverter drive circuit has a practical result wherein the capacity of the component parts which constitute the protective circuit can be made smaller in comparison with an overcurrent protective system that interrupts the main portion of the inverter circuit carrying a heavy current flow.

As many widely different embodiments of the present invention may be made without departing from the spirit and scope thereof, it is to be understood that the invention is not limited to the specific embodiments thereof except as defined in the appended claims.

What we claim is:

1. In a speed control system which includes an inverter circuit for converting a direct current into a polyphase alternating current in the form of a rectangular wave by the switching action of transistors, and an inverter drive circuit for regulating the output frequency of the inverter circuit to a prescribed value, an AC motor being energized by the alternating current supplied thereto by the inverter circuit, an improved protective system for the inverter circuit, comprising:

overcurrent detection means for detecting the current that flows through the output side of the inverter circuit;

means for interrupting the operation of the inverter drive circuit in response to a signal from said overcurrent detection means when said overcurrent detection means detects an overcurrent;

means for restoring the operation of the inverter drive circuit for fixed periods;

the operation of the inverter circuit being interrupted when the current flowing through the transistors thereof is caused when an overload in the AC motor reaches a predetermined value, and restored after the lapse of a fixed period of time; and the means for restoring the operation of the inverter drive circuit for fixed periods comprises a flip-flop circuit and a pulse generator, the inverter drive circuit when in the interrupted state being restored to the operative state by an output signal from said flip-flop circuit which is set by a pulse generated by said pulse generator.

2. A protective system according to claim 1, wherein the oscillation frequency of the pulse generator is higher than that of the power source for driving the AC motor.

3. In a protective system for an inverter circuit used in driving an AC motor, having an inverter circuit for converting a direct current into three-phase alternating current in the form of a rectangular wave by switching action of transistors, three-phase rectangular signal generating means for generating a three-phase rectangular signal of a frequency that is proportional to a deviation between a command speed and an actual speed, an inverter drive circuit for regulating the output frequency of said inverter circuit to a prescribed value upon receiving said three-phase rectangular signal, and overcurrent detection means provided for each of the three phases for detecting an overcurrent that flows through the output side of said inverter circuit, wherein when the overcurrent detection means for a certain phase detects an overcurrent, the current flowing through the inverter circuit transistor corresponding to said phase is made less than a predetermined overcurrent value by the inverter drive circuit, said protective system further comprising:

first means for interrupting the operation of the inverter drive circuit when the overcurrent detection means detects an overcurrent; and second means for setting the inverter drive circuit in an operative state for fixed periods; wherein when the overcurrent detection means detects an overcurrent, only the inverter circuit transistor corresponding to the phase in which the overcurrent has occurred is turned on and off for fixed periods by each of said first and second means to chop-control only the primary voltage of said phase, whereby the current flowing through said transistor is made less than the predetermined overcurrent value.

4. The protective system according to claim 3, characterized in that the second means for setting the inverter drive circuit in the operative state for fixed periods comprises a flip-flop circuit and a pulse generator, the inverter drive circuit when in the interrupted state being restored to the operative state by an output signal from said flip-flop circuit which is set by a pulse generated by said pulse generator.

5. The protective system according to claim 4, characterized in that the oscillation frequency of the pulse generator is higher than the frequency of the power source for driving the AC motor.

* * * * *